United States Patent
Naylor et al.

(10) Patent No.: US 11,783,826 B2
(45) Date of Patent: Oct. 10, 2023

(54) SYSTEM AND METHOD FOR DATA AUGMENTATION AND SPEECH PROCESSING IN DYNAMIC ACOUSTIC ENVIRONMENTS

(71) Applicant: Nuance Communications, Inc., Burlington, MA (US)

(72) Inventors: Patrick A. Naylor, Reading (GB); Dushyant Sharma, Woburn, MA (US); Uwe Helmut Jost, Groton, MA (US); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 111 days.

(21) Appl. No.: 17/178,785

(22) Filed: Feb. 18, 2021

(65) Prior Publication Data
US 2022/0262357 A1    Aug. 18, 2022

(51) Int. Cl.
*G10L 15/22* (2006.01)
*G10L 15/06* (2013.01)
*G10L 21/0332* (2013.01)
*G10L 21/0224* (2013.01)
*G10L 21/0216* (2013.01)

(52) U.S. Cl.
CPC ............ *G10L 15/22* (2013.01); *G10L 15/063* (2013.01); *G10L 21/0224* (2013.01); *G10L 21/0332* (2013.01); *G10L 2021/02166* (2013.01)

(58) Field of Classification Search
CPC ... G10L 15/22; G10L 15/063; G10L 21/0208; G10L 2021/02166; G10L 21/0224; G10L 21/028; G10L 21/0216; G10L 2021/02165; G10L 21/0332
See application file for complete search history.

(56) References Cited

U.S. PATENT DOCUMENTS

| 5,960,397 | A  | * | 9/1999 | Rahim | G10L 15/20 704/256.2 |
| 2007/0086603 | A1 | * | 4/2007 | Lyon | H04R 3/005 381/59 |
| 2010/0246851 | A1 | * | 9/2010 | Buck | G10L 21/0208 381/94.1 |
| 2011/0305345 | A1 | * | 12/2011 | Bouchard | G10L 21/0208 704/226 |
| 2017/0040016 | A1 | * | 2/2017 | Cui | G10L 15/02 |
| 2017/0178664 | A1 | * | 6/2017 | Wingate | G10L 25/30 |
| 2017/0345437 | A1 | * | 11/2017 | Zhang | G10L 21/0224 |
| 2017/0358294 | A1 | * | 12/2017 | Hatfield | G10L 21/0208 |

(Continued)

OTHER PUBLICATIONS

Ma, "Data Augmentation for Speech Recognition") Towards data Science, May 1, 2019, pp. 1-10. (Year: 2019).*

(Continued)

*Primary Examiner* — Vijay B Chawan
(74) *Attorney, Agent, or Firm* — Brian J. Colandreo; Heath M. Sargeant; Holland & Knight LLP

(57) ABSTRACT

A method, computer program product, and computing system for receiving one or more inputs indicative of at least one of: a relative location of a speaker and a microphone array, and a relative orientation of the speaker and the microphone array. One or more reference signals may be received. A speech processing system may be trained using the one or more inputs and the one or more reference signals.

14 Claims, 9 Drawing Sheets

(56) References Cited

U.S. PATENT DOCUMENTS

| | | | | |
|---|---|---|---|---|
| 2018/0317876 | A1* | 11/2018 | Emmanouilidou | G16H 40/63 |
| 2018/0330745 | A1* | 11/2018 | Ebenezer | H04R 3/005 |
| 2019/0043491 | A1* | 2/2019 | Kupryjanow | G10L 21/0208 |
| 2019/0096429 | A1* | 3/2019 | Kowali | G10L 21/0208 |
| 2019/0272818 | A1* | 9/2019 | Fernandez | G10L 13/00 |
| 2020/0279557 | A1* | 9/2020 | Li | G10L 21/0208 |
| 2020/0395003 | A1* | 12/2020 | Sharma | H04S 7/30 |
| 2021/0174792 | A1* | 6/2021 | Zheng | G01S 3/8006 |
| 2022/0262342 | A1* | 8/2022 | Naylor | G10L 21/02 |
| 2022/0262343 | A1* | 8/2022 | Naylor | H04R 1/406 |

OTHER PUBLICATIONS

Ravanelli et al., ("Multi-taskself-supervised learning fordobustspeech recognition", ICASSP 2020, IEEE international Conference on Acoustics, Speech and Signal Processing (ICASSP), May 8, 2020, pp. 1-5. (Year: 2020).*

Ma, Edward, "Data Augmentation for Speech Recognition", Retrieved From: https://towardsdatascience.com/data- augmentation-for-speech-recognition-e7c607482e78, May 1, 2019, 7 Pages.

"International Search Report and Written Opinion Issued in PCT Application No. PCT/US22/016832", Dated: Jun. 14, 2022, 12 Pages.

Ravanelli, et al., "Multi-Task Self-Supervised Learning for Robust Speech Recognition", In Proceedings of IEEE International Conference on Acoustics, Speech and Signal Processing (ICASSP), May 4, 2020, 5 Pages.

* cited by examiner

10

200 defining a model representative of a plurality of acoustic variations to a speech signal, thus defining a plurality of time-varying spectral modifications

↓

202 applying the plurality of time-varying spectral modifications to a reference signal using a filtering operation, thus generating a time-varying spectrally-augmented signal

↓

220 training a speech processing system using the time-varying spectrally-augmented signal, thus defining a trained speech processing system

↓

224 performing speech processing via the trained speech processing system, wherein the trained speech processing system is executed on at least one computing device

--- defining a model representative of a plurality of acoustic variations to the speech signal associated with a change in a relative position of a speaker and a microphone — 204 defining a model representative of a plurality of acoustic variations to the speech signal associated with adaptive beamforming — 206 modeling the plurality of acoustic variations to the speech signal as a statistical distribution — 208 modeling the plurality of acoustic variations to the speech signal as a mathematical model representative of the plurality of acoustic variations to the speech signal associated with a particular use-case scenario — 210 receiving one or more inputs associated with one or more of speaker location and speaker orientation — 212 generating, via a machine learning model, a mapping of the plurality of acoustic variations to one or more feature coefficients of a target domain — 214 applying the plurality of time-varying spectral modifications to the reference signal using a plurality of time-varying parameters in time domain filtering — 216 applying the plurality of time-varying spectral modifications to the reference signal using a plurality of time-varying multiplication factors in frequency domain filtering — 218 training a speech processing system using the time-varying spectrally-augmented signal and the one or more inputs associated with one or more of speaker location and speaker orientation — 222

FIG. 2

SYSTEM AND METHOD FOR DATA AUGMENTATION AND SPEECH PROCESSING IN DYNAMIC ACOUSTIC ENVIRONMENTS

TECHNICAL FIELD

This disclosure relates to data augmentation and speech processing systems and methods and, more particularly, to systems and methods for data augmentation and speech processing in dynamic acoustic environments.

BACKGROUND

Data augmentation allows for the generation of new training data for any machine learning system by augmenting existing data to represent new conditions. For example, data augmentation has been used to improve robustness to noise and reverb, and other unpredictable characteristics of speech. In many situations, a microphone array may be used to receive speech signals. However, microphone arrays can have the effect of filtering the spectrum of speech in a way that depends on angle. For example, if the position of a speaker varies with time in the beampattern of a beamformer, the speech may be affected by a time-varying filter. In the case of adaptive beamforming, the beamformer may attempt to steer dynamically towards a speaker, thereby introducing another time variation.

SUMMARY OF DISCLOSURE

In one implementation, a computer-implemented method is executed on a computing device and includes receiving one or more inputs indicative of at least one of: a relative location of a speaker and a microphone array, and a relative orientation of the speaker and the microphone array. One or more reference signals may be received. A speech processing system may be trained using the one or more inputs and the one or more reference signals.

One or more of the following features may be included. Receiving the one or more inputs may include one or more of: receiving the one or more inputs from one or more sensors positioned within a monitored space; and generating the one or more inputs. Receiving the one or more reference signals may include one or more of: receiving one or more speech signals via the microphone array; and generating one or more time-varying spectrally-augmented signals. Training the speech processing system using the one or more inputs and the one or more reference signals may include training the speech processing system using the one or more speech signals received via the microphone array and the one or more generated time-varying spectrally-augmented signals. One or more run-time inputs, indicative of at least one of: a relative location of the speaker and the microphone array, and a relative orientation of the speaker and the microphone array, may be received. A speech signal may be received via the microphone array. Speech processing may be performed via the trained speech processing system using the one or more run-time inputs and the speech signal. Training the speech processing system using the one or more inputs and the reference signal may include training a plurality of speech processing models for a plurality of acoustic variations associated with the one or more reference signals. Performing speech processing via the trained speech processing system using the one or more run-time inputs and the speech signal may include selecting at least one trained speech processing model from the plurality of trained speech processing models based upon, at least in part, the one or more run-time inputs and the speech signal.

In another implementation, a computer program product resides on a computer readable medium and has a plurality of instructions stored on it. When executed by a processor, the instructions cause the processor to perform operations including receiving one or more inputs indicative of at least one of: a relative location of a speaker and a microphone array, and a relative orientation of the speaker and the microphone array. One or more reference signals may be received. A speech processing system may be trained using the one or more inputs and the one or more reference signals.

One or more of the following features may be included. Receiving the one or more inputs may include one or more of: receiving the one or more inputs from one or more sensors positioned within a monitored space; and generating the one or more inputs. Receiving the one or more reference signals may include one or more of: receiving one or more speech signals via the microphone array; and generating one or more time-varying spectrally-augmented signals. Training the speech processing system using the one or more inputs and the one or more reference signals may include training the speech processing system using the one or more speech signals received via the microphone array and the one or more generated time-varying spectrally-augmented signals. One or more run-time inputs, indicative of at least one of: a relative location of the speaker and the microphone array, and a relative orientation of the speaker and the microphone array, may be received. A speech signal may be received via the microphone array. Speech processing may be performed via the trained speech processing system using the one or more run-time inputs and the speech signal. Training the speech processing system using the one or more inputs and the reference signal may include training a plurality of speech processing models for a plurality of acoustic variations associated with the one or more reference signals. Performing speech processing via the trained speech processing system using the one or more run-time inputs and the speech signal may include selecting at least one trained speech processing model from the plurality of trained speech processing models based upon, at least in part, the one or more run-time inputs and the speech signal.

In another implementation, a computing system includes at least one processor and at least one memory architecture coupled with the at least one processor, wherein the at least one processor is configured to receive one or more inputs indicative of at least one of: a relative location of a speaker and a microphone array, and a relative orientation of the speaker and the microphone array, wherein the at least one processor is further configured to receive one or more reference signals; and wherein the at least one processor is further configured to train a speech processing system using the one or more inputs and the one or more reference signals.

One or more of the following features may be included. Receiving the one or more inputs may include one or more of: receiving the one or more inputs from one or more sensors positioned within a monitored space; and generating the one or more inputs. Receiving the one or more reference signals may include one or more of: receiving one or more speech signals via the microphone array; and generating one or more time-varying spectrally-augmented signals. Training the speech processing system using the one or more inputs and the one or more reference signals may include training the speech processing system using the one or more speech signals received via the microphone array and the one or more generated time-varying spectrally-augmented signals. One or more run-time inputs, indicative of at least one of: a relative location of the speaker and the microphone array, and a relative orientation of the speaker and the microphone array, may be received. A speech signal may be received via the microphone array. Speech processing may be performed via the trained speech processing system using the one or more run-time inputs and the speech signal. Training the speech processing system using the one or more inputs and the reference signal may include training a plurality of speech processing models for a plurality of acoustic variations associated with the one or more reference signals. Performing speech processing via the trained speech processing system using the one or more run-time inputs and the speech signal may include selecting at least one trained speech processing model from the plurality of trained speech processing models based upon, at least in part, the one or more run-time inputs and the speech signal.

The details of one or more implementations are set forth in the accompanying drawings and the description below. Other features and advantages will become apparent from the description, the drawings, and the claims.

BRIEF DESCRIPTION OF THE DRAWINGS

FIG. 2 is a flow chart of one implementation of the data augmentation process and the speech processing process of FIG. 1;

Like reference symbols in the various drawings indicate like elements.

DETAILED DESCRIPTION OF THE PREFERRED EMBODIMENTS

Figure 1:
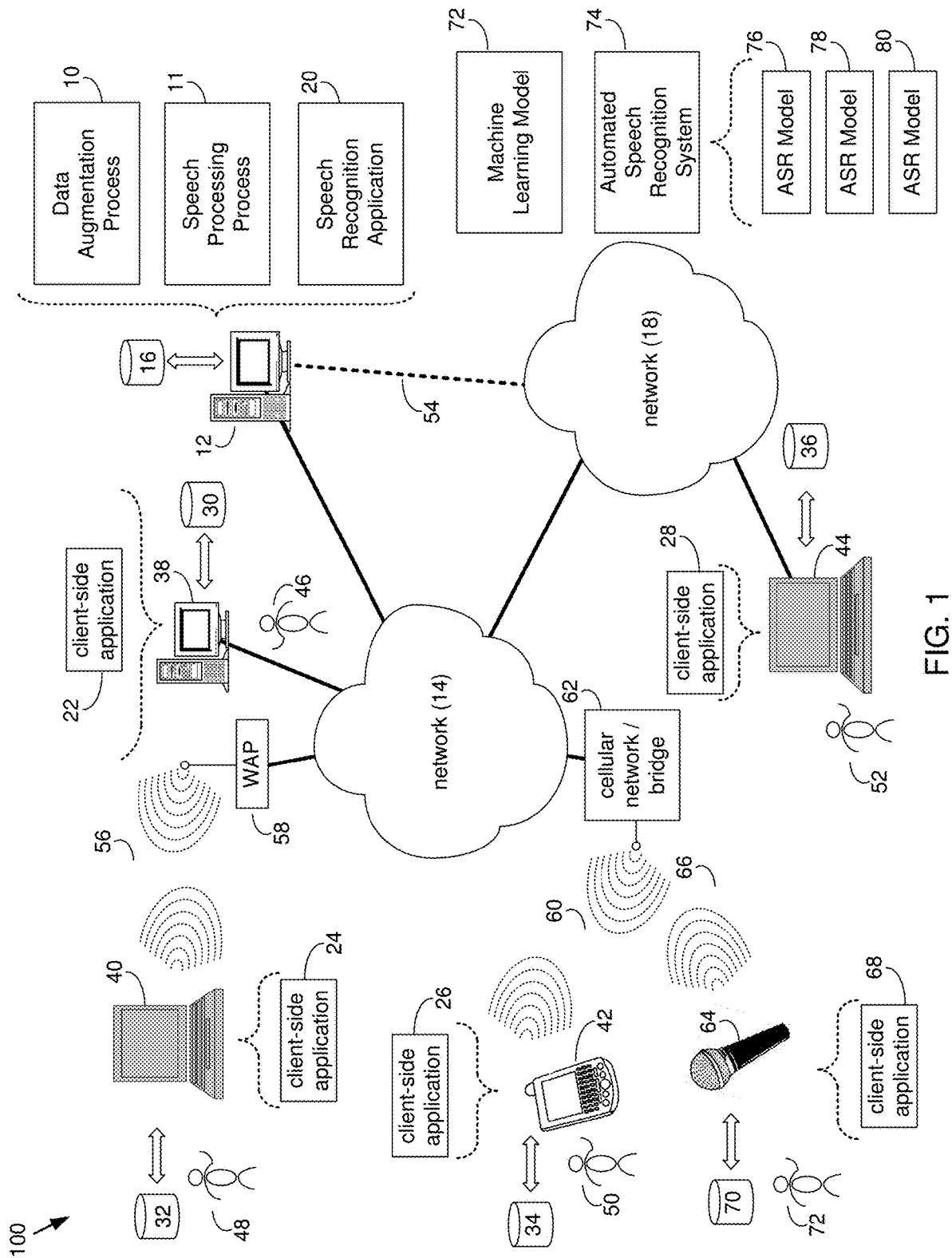
FIG. 1 is a diagrammatic view of a data augmentation process and an speech processing process coupled to a distributed computing network.

Referring now to FIG. 1, there is shown data augmentation process 10 and speech processing process 11 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a data augmentation process, such as data augmentation process 10 of FIG. 1, may define a model representative of a plurality of acoustic variations to a speech signal, thus defining a plurality of time-varying spectral modifications. The plurality of time-varying spectral modifications may be applied to a reference signal using a filtering operation, thus generating a time-varying spectrally-augmented signal. Additionally, a speech processing process, such as speech processing process 11 of FIG. 1, may receive one or more inputs indicative of at least one of: a relative location of a speaker and a microphone array, and a relative orientation of the speaker and the microphone array. One or more reference signals may be received. A speech processing system may be trained using the one or more inputs and the reference signal.

The instruction sets and subroutines of data augmentation process 10 and/or speech processing process 11, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Data augmentation process 10 and/or speech processing process 11 may be a stand-alone application that interfaces with an applet/application that is accessed via client applications 22, 24, 26, 28, 66. In some embodiments, data augmentation process 10 may be, in whole or in part, distributed in a cloud computing topology. In this way, computing device 12 and storage device 16 may refer to multiple devices, which may also be distributed throughout network 14 and/or network 18.

Computing device 12 may execute a speech recognition application (e.g., speech recognition application 20), examples of which may include, but are not limited to, automated speech recognition (ASR) programs and applications, speech-to-text (SST) programs and applications, computer speech recognition programs and applications, voice recognition programs and applications, in-vehicle voice command programs and applications, etc. including those available from Nuance Communications, Inc. of Burlington, Mass. Data augmentation process 10 and/or speech recognition application 20 may be accessed via client applications 22, 24, 26, 28, 68. Data augmentation process 10 and/or speech processing process 11 may be a stand-alone application, or may be an applet/application/script/extension that may interact with and/or be executed within speech recognition application 20, a component of speech recognition application 20, and/or one or more of client applications 22, 24, 26, 28, 68. Speech recognition application 20 may be a stand-alone application, or may be an applet/application/script/extension that may interact with and/or be executed within data augmentation process 10 and/or speech processing process 11, a component of data augmentation process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of data augmentation process 10, speech processing process 11, and/or speech recognition application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of data augmentation process 10 and/or speech processing process 11 (and vice versa). Accordingly, data augmentation process 10 and/or speech processing process 11 may be a purely server-side application, a purely client-side application, or a hybrid server-side/client-side application that is cooperatively executed by one or more of client applications 22, 24, 26, 28, 68 and/or data augmentation process 10 and/or speech processing process 11.

One or more of client applications 22, 24, 26, 28, 68 may be configured to effectuate some or all of the functionality of speech recognition application 20 (and vice versa). Accordingly, speech recognition application 20 may be a purely server-side application, a purely client-side application, or a hybrid server-side/client-side application that is cooperatively executed by one or more of client applications 22, 24, 26, 28, 68 and/or speech recognition application 20. As one or more of client applications 22, 24, 26, 28, 68 data augmentation process 10, speech processing process 11, and speech recognition application 20, taken singly or in any combination, may effectuate some or all of the same functionality, any description of effectuating such functionality via one or more of client applications 22, 24, 26, 28, 68, data augmentation process 10, speech processing process 11, speech recognition application 20, or combination thereof, and any described interaction(s) between one or more of client applications 22, 24, 26, 28, 68 data augmentation process 10, speech processing process 11, speech recognition application 20, or combination thereof to effectuate such functionality, should be taken as an example only and not to limit the scope of the disclosure.

Users 46, 48, 50, 52 may access computing device 12 and data augmentation process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Data augmentation process 10 may include one or more user interfaces, such as browsers and textual or graphical user interfaces, through which users 46, 48, 50, 52 may access data augmentation process 10 and/or speech processing process 11.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, audio recording device 64 may be wirelessly coupled to network 14 via wireless communication channel 66 established between client electronic device 42 and cellular network/bridge 62, which is shown directly coupled to network 14. Storage device 70 may be coupled to audio recording system 64 and may include but is not limited to: hard disk drives; flash drives, tape drives; optical drives; RAID arrays; random access memories (RAM); and read-only memories (ROM). User 72 may access computing device 12 and data augmentation process 10 (e.g., using one or more of audio recording system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations consistent with the present disclosure, systems and methods may be provided for data augmentation in dynamic acoustic environments. As discussed above and in some implementations, data augmentation may generally allow for the generation of new training data for any machine learning system by augmenting existing data to represent new conditions and constraints. For example, data augmentation has been used to improve robustness to noise and reverb, and other unpredictable characteristics of speech signals. In many situations, a microphone array may be used to receive speech signals. However, microphone arrays can have the effect of filtering the spectrum of speech in a way that depends on angle. For example, if the position of a speaker varies with time in the beampattern of a beamformer, the speech may be affected by a time-varying filter. In the case of adaptive beamforming, the beamformer may attempt to steer dynamically towards a speaker, thereby introducing another time variation. In some implementations and as will be discussed in greater detail below, implementations of data augmentation process 10 may specifically augment training data to account for the time variations and may be designed to model the physical variations expected when a specific beamformer is employed in a specific use case.

As discussed above and referring also at least to FIGS. 2-9, data augmentation process 10 may define 200 a model representative of a plurality of acoustic variations to a speech signal, thus defining a plurality of time-varying spectral modifications. The plurality of time-varying spectral modifications may be applied 202 to a reference signal using a filtering operation, thus generating a time-varying spectrally-augmented signal.

In some implementations, data augmentation process 10 may define 200 a model representative of a plurality of acoustic variations to a speech signal, thus defining a plurality of time-varying spectral modifications. Referring also to the example of FIG. 3 and in some implementations, a microphone array (e.g., microphone array 300) may include a plurality of discrete microphone elements (e.g., microphone elements 302, 304, 306). While example microphone array 300 includes e.g., three microphone elements, it will be appreciated that microphone array 300 may include any number of microphone elements within the scope of the present disclosure. Examples of microphone array 300 may generally include a microphone array of a headset, a microphone array of a computing device, a microphone array of a camera system, and/or combinations thereof. Accordingly, it will be appreciated that a microphone array may include any configuration of discrete microphone elements within the scope of the present disclosure.

Figure 3:
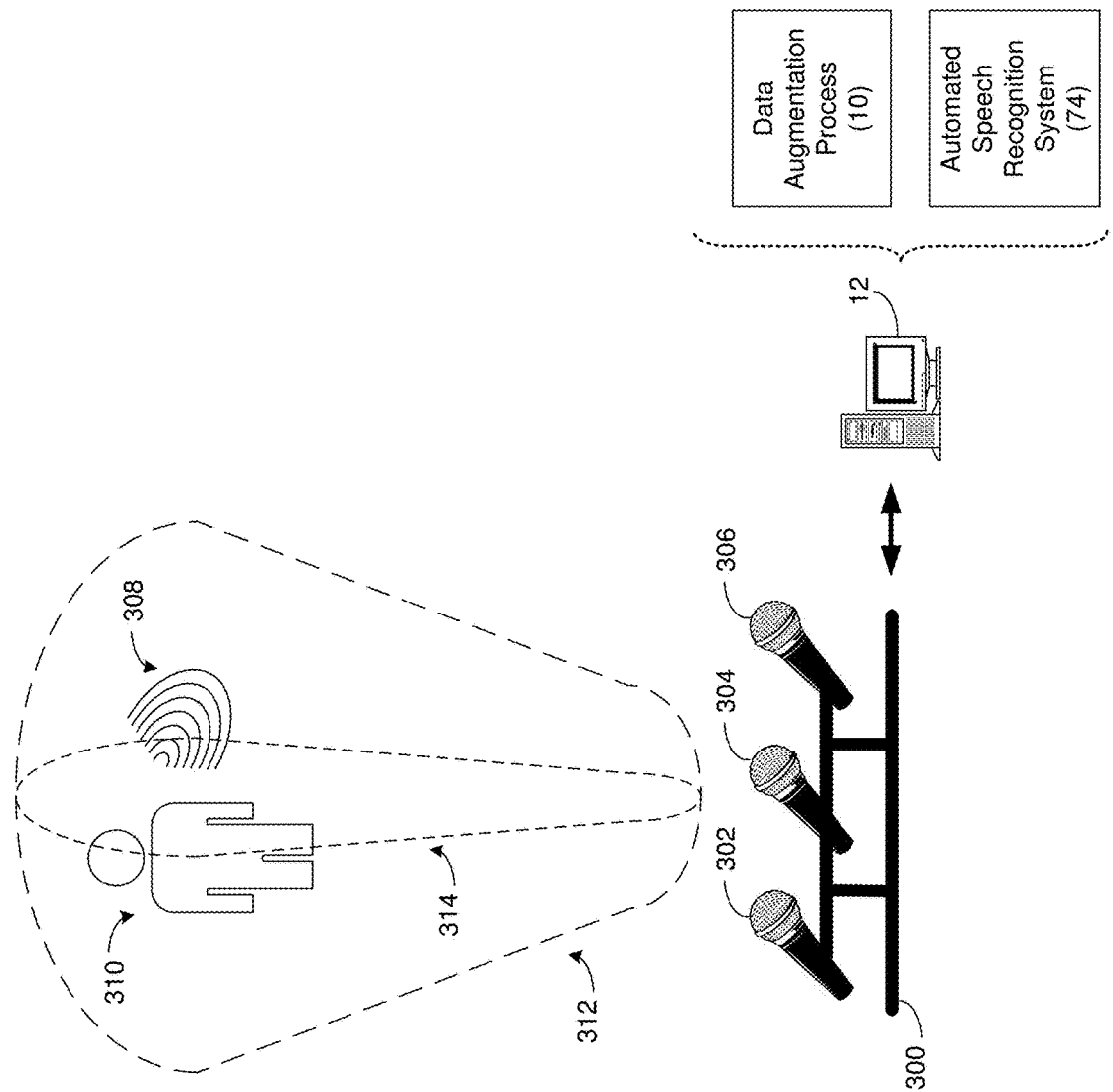
FIG. 3 is a diagrammatic view of a microphone array deployed in a monitored space while a speaker is speaking according to one implementation of the data augmentation process of FIG. 1.
Figure 4:
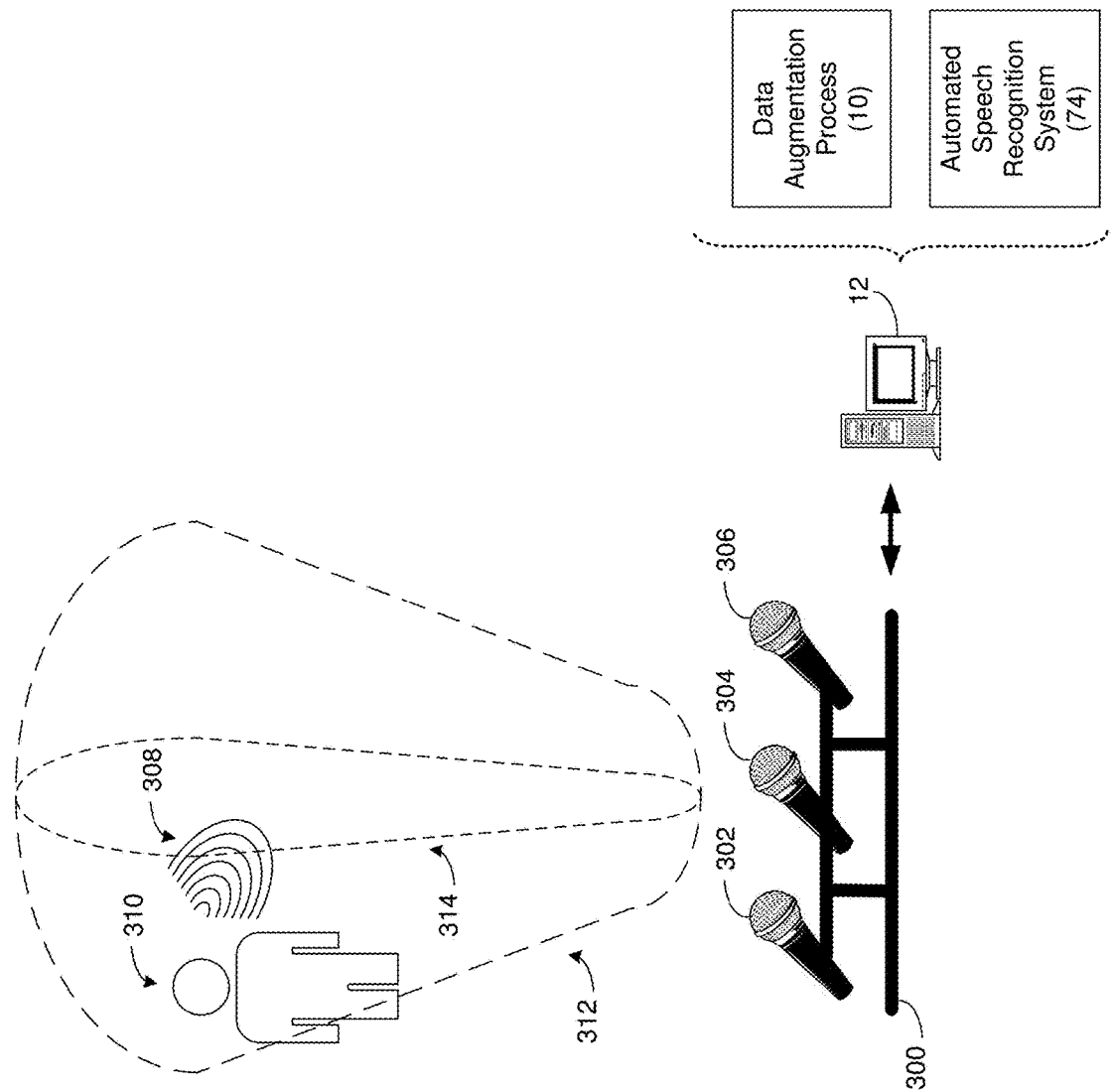
FIG. 4 is a diagrammatic view of a microphone array deployed in a monitored space while a speaker is moving and speaking according to one implementation of the data augmentation process of FIG. 1.
Figure 5:
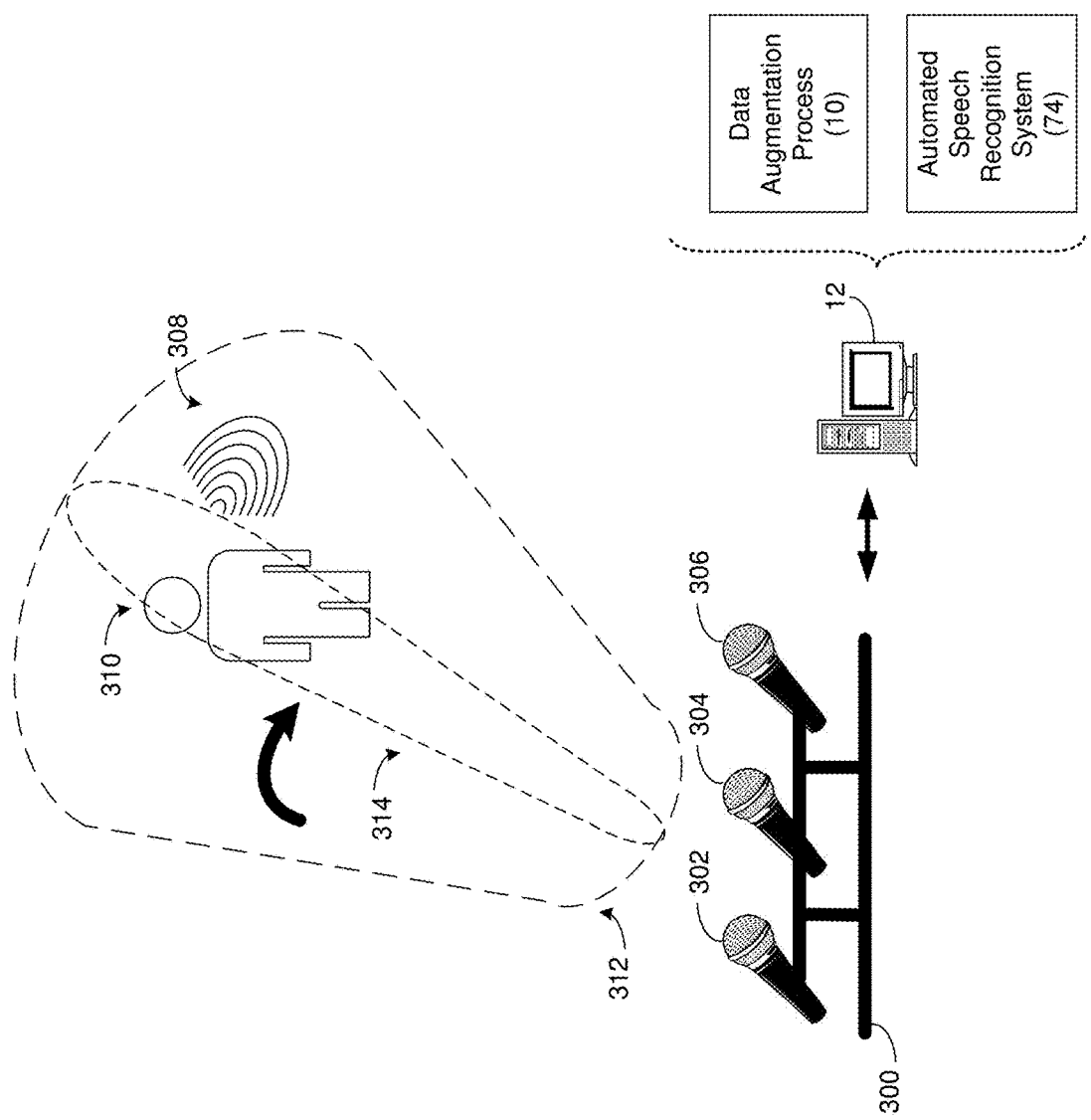
FIG. 5 is a diagrammatic view of a microphone array deployed in a monitored space while a speaker is speaking and as the microphone array beamsteers toward the speaker according to one implementation of the data augmentation process of FIG. 1.

In some implementations, the microphone array (e.g., microphone array 300) may be configured to receive various sound signals from a monitored space (i.e., a space adjacent to microphone array 300). As shown in the example of FIG. 3, microphone array 300 may be configured to receive one or more speech signals (e.g., speech signal 308) from one or more speakers (e.g., speaker 310). In one example, suppose the speaker (e.g., speaker 310) is stationary (i.e., speaker 310 does not move relative to microphone array 300 while speaking). In this example, each microphone element (e.g., microphone elements 302, 304, 306) may be configured to receive the one or more speech signals (e.g., speech signal 308) from the speaker (e.g., speaker 310). In some implementations, the microphone array (e.g., microphone array 300) may allow the plurality of discrete microphone elements (e.g., microphone elements 302, 304, 306) to form a beamformer.

As is known in the art, beamforming is a signal processing technique used in sensor arrays for directional signal transmission or reception. In the example of audio signals, beamforming is achieved by combining the plurality of discrete microphone elements (e.g., microphone elements 302, 304, 306) in the microphone array (e.g., microphone array 300) in such a way that signals at particular angles experience constructive interference while others experience destructive interference. By using the combined signals from each microphone element, a speech signal may be received with less noise and/or less reverberation. In this manner, the plurality of microphone elements may create a beam of sensitivity which may be configured to pick up or receive speech signals in a chosen direction more sensitively than in other areas. In some implementations, the spatial sensitivity to speech signals may be frequency-dependent. For example, for receiving high frequency signals, the beam of sensitivity may be narrow while the beam of sensitivity for low frequency signals may be wide. As will be discussed in greater detail below, changes in a relative position of a sound source (e.g., a speaker) and a microphone array (e.g., microphone array 300) may cause acoustic variations to the speech signal received by the microphone array. For example, movements of a sound source (e.g., a speaker) may cause acoustic variations to the speech signal received by the microphone array.

Returning to the example of FIG. 3, suppose microphone elements 302, 304, 306 are configured as a beamformer with greater sensitivity for receiving speech signals (e.g., speech signal 308) at a predefined location within the monitored space. In this example, suppose the beamformer created by microphone array 300 has a low frequency beam of sensitivity (e.g., low frequency beampattern 312) and a high frequency beam of sensitivity (e.g., high frequency beampattern 314). While the terms "low" and "high" have been provided to describe beampatterns 312, 314, it will be appreciated that any frequency may be applied within the scope of the present disclosure and as frequency increases from 0 Hz, the beampattern may decrease in size. Accordingly, it will be appreciated that any number of frequencies may be represented by any number of distinct beampatterns. For example, a continuum of frequencies may give rise to a corresponding continuum of beampatterns. As shown in the example of FIG. 3, while speaker 310 is speaking in the center of the beamformer, low and high frequency sound signals are within the beam of sensitivity for each frequency.

However, suppose the speaker position varies with time (e.g., the speaker moves across the monitored space or the speaker's head rotates in one direction), the speech signal (e.g., speech signal 308) may be impacted by acoustic variations related to the speaker's movement. In another example, suppose the microphone array position varies with time (e.g., the microphone array moves within the monitored space relative to the speaker), the speech signal (e.g., speech signal 308) may be impacted by acoustic variations related to the movement of the microphone array.

In another example, suppose the beamformer formed by a microphone array is configured for adaptive beamforming and beamsteering by dynamically modifying and steering the beampattern(s) toward a speaker. In this example, beamsteering may introduce acoustic variations to the speech signal.

In some implementations, defining 200 the model representative of the plurality of acoustic variations to the speech signal may include defining 204 a model representative of a plurality of acoustic variations to the speech signal that are associated with a change in a relative position of a speaker and a microphone. Referring also to the example of FIG. 4 and in some implementations, suppose a speaker (e.g., speaker 310) moves within the monitored space while speaking. In this example, the movement of speaker 310 may cause the speech signal (e.g., speech signal 308) to be within the low frequency beampattern (e.g., low frequency beam pattern 312) but outside the high frequency beampattern (e.g., high frequency beampattern 314). As such, the movement of speaker 310 may introduce acoustic variations to speech signal 308 received by microphone array 300.

In another example, suppose a microphone array (e.g., microphone array 300) moves within the monitored space while the speaker (e.g., speaker 310) is speaking (e.g., microphone array 300 is a part of a robot or drone that moves within the monitored space). In this example, the movement of microphone array 300 may cause the speech signal (e.g., speech signal 308) to be within low frequency beampatterns but outside of higher frequency beampatterns. While examples have been provided of a speaker moving and a microphone array moving, it will be appreciated that data augmentation process 10 may define 204 a model representative of the plurality of acoustic variations to the speech signal that are associated with any change in a relative position of a speaker and a microphone.

In some implementations, defining 200 the model representative of the plurality of acoustic variations to the speech signal may include defining 206 a model representative of a plurality of acoustic variations to the speech signal associated with adaptive beamforming. Referring also to the example of FIG. 5 and in some implementations, suppose microphone array 300 is configured for adaptive beamforming and beamsteering. In this example, the movement of beampatterns (e.g., high frequency beampattern 314 and low frequency beampattern 312) may introduce acoustic variations to speech signal 308. In some implementations and as will be discussed in greater detail below, data augmentation process 10 may define 206 a model representative of the plurality of acoustic variations to the speech signal associated with adaptive beamforming.

In some implementations and as discussed above, a change in the relative positioning of a speaker and the microphone array and/or adaptive beamforming may introduce acoustic variations to a speech signal. In some implementations, these acoustic variations may be modeled as a plurality of time-varying spectral modifications. For example, speech or audio signals may be represented or measured in the time, frequency, and/or modulation domains. In the time domain, a speech signal's amplitude or power may be observed as a function of time. In the frequency domain, a speech signal's amplitude or power may be observed as a function of frequency of the speech signal. In the modulation domain, a speech signal's power may be observed as temporal variations of frequency components of the speech signal.

In some implementations, a speech signal may be modeled in the modulation domain by obtaining frequency components from the speech signal. In some implementations, data augmentation process 10 may obtain the frequency components from the speech signal by applying a Short-Time Fourier Transform (STFT) to the speech signal. While a STFT is discussed as a way of obtaining frequency components from the speech signal, it will be appreciated that other transformations may be used to derive the modulation domain within the scope of the present disclosure. Applying a STFT to a speech signal may include applying overlapped framing with an analysis window. For example, a speech signal (e.g., received speech signal 308) may be recorded by a microphone array (e.g., microphone array 300) as a time waveform in the time domain. Data augmentation process 10 may convert the time waveform of the speech signal into a sequence of short excerpts of the time waveform. Data augmentation process 10 may convert each of the short excerpts to the frequency domain by applying a Fourier transform in combination with a window function, where such window functions are known in the art. Additionally, one or more band-pass filters may be applied and the received speech signal may be converted by data augmentation process 10 to a plurality of speech signals for a plurality of frequency bands.

As is known in the art, the frequency bands or frequency bins from the Fourier transform may be combined with the time windows to form a plurality of time frequency spectrum cells. The power or amplitude of the speech signals may be defined relative to time and frequency in each the time frequency spectrum cells. As will be discussed in greater detail below, the plurality of acoustic variations associated with time-varying changes or movements (e.g., a change in the relative positioning of a speaker and the microphone array and/or movement associated with adaptive beamforming and beamsteering) may be realized when observed in the modulation domain.

In some implementations, data augmentation process 10 may model 208 the plurality of acoustic variations to the speech signal as a statistical distribution. For example, the speech magnitude spectrum may vary according to a statistical distribution or model so that, as will be discussed in greater detail below, a modification scale factor may be applied to each time-frequency data point and the modification scale factor is drawn from a previously determined statistical distribution. In one example, data augmentation process 10 may model 208 the plurality of acoustic variations to the speech signal (e.g., resulting from a change in the relative positioning of a speaker and the microphone array and/or adaptive beamforming) as a Gaussian distribution. In this example and as will be discussed in greater detail below, data augmentation process 10 may generate data augmentations (e.g., a time-varying spectrally-augmented signal) by choosing modification scale factors with different means and variances to represent a plurality of acoustic variations to a speech signal associated with a change in the relative positioning of a speaker and the microphone array and/or adaptive beamforming. While an example of Gaussian distribution has been provided for a statistical distribution, it will be appreciated that data augmentation process 10 may model 208 the plurality of acoustic variations to the speech signal as any statistical distribution within the scope of the present disclosure. In some implementations, data augmentation process 10 may allow a user to select (e.g., via a graphical user interface) a particular statistical distribution from a plurality of statistical distributions for modeling the plurality of acoustic variations.

In some implementations, defining 200 the model representative of the plurality of acoustic variations to the speech signal may include modeling 210 the plurality of acoustic variations to the speech signal as a mathematical model representative of the plurality of acoustic variations to the speech signal associated with a particular use-case scenario. For example, the speech signal magnitude spectrum may vary according to a mathematical model matched to a particular use-case scenario so that a modification scale factor may be applied to each time-frequency data point where the modification scale factor is representative of the actual acoustic variations observed in examples of the particular use-case scenario. In some implementations and as discussed above, the acoustic variations may be dependent upon two elements: the beampattern of the beamformer and the movement of the sound sources in and out of the beamformer's beam.

As an example, if the use-case scenario were to be a business meeting, data augmentation process 10 may generate data augmentations by selecting time-varying factors representative of e.g., head-movements during conversation-following behavior. In this example, data augmentation process 10 may receive a speech signal via a headset that the speaker (e.g., speaker 310) is wearing. Additionally, a microphone array (e.g., microphone array 300) may be configured to receive the speech signal (e.g., speech signal 308). As the speaker's head moves, data augmentation process 10 may identify the spectral modifications between the speech signal recorded by the headset and the speech signal recorded by the microphone array (e.g., microphone array 300). As such, data augmentation process 10 may model 210 the plurality of acoustic variations associated with e.g., speaker head-movements during conversation-following behavior as a mathematical model based upon, at least in part, the identified spectral modifications between the speech signal recorded by the headset and the speech signal recorded by the microphone array.

While an example of a business meeting with acoustic variations resulting from head-movements has been provided for a particular use-case scenario, it will be appreciated that acoustic variations associated with any use-case scenario may be modeled 210 as a mathematical model within the scope of the present disclosure. In some implementations, data augmentation process 10 may allow a user to select (e.g., via a graphical user interface) a particular use-case scenario from a plurality of use-case scenarios and/or a mathematical model from a plurality of mathematical models for modeling the plurality of acoustic variations.

In some implementations, defining 200 the model representative of the plurality of acoustic variations to the speech signal may include receiving 212 one or more inputs associated with one or more of speaker location and speaker orientation. For example, data augmentation process 10 may receive 212 one or more inputs from various sensors (e.g., audio-visual sensors, camera systems, microphone array 300, etc.). In some implementations, the one or more inputs may indicate a speaker's location within the monitored space and/or a speaker's orientation (e.g., head orientation, body orientation, etc.) within the monitored space. For example, data augmentation process 10 may receive 212 an input indicative of a direction of arrival (DOA) angle estimated by a beamformer.

In another example, data augmentation process 10 may receive 212 one or more inputs indicative of a speaker's orientation (e.g., whether the speaker is facing the microphone array, whether the speaker is facing away from the microphone array, etc.). For example, suppose the one or more inputs include a video of the speaker. In some implementations, the one or more inputs may represent a user's orientation (e.g., head orientation, body orientation, etc.) as a numerical value (e.g., a two-bit number indicating whether the speaker's head is orientated straight toward the microphone array, whether the speaker's head is oriented 90 degrees left of or right of the microphone array, etc.). While examples of types of inputs associated with one or more of speaker location and speaker orientation have been provided, it will be appreciated that various types of inputs may be received 212 by data augmentation process 10 within the scope of the present disclosure. In some implementations and as will be discussed in greater detail below, the one or more inputs indicative of a speaker's orientation may be provided as input during training of an speech processing system (e.g., an automated speech recognition (ASR) system, a voice biometric system, emotion detection system, medical symptom detection symptom, hearing enhancement system).

Returning to the above use-case scenario of a business meeting, data augmentation process 10 may receive 212 one or more inputs associated with head-movements during conversation-following behavior. In this example, a microphone array (e.g., microphone array 300) may be configured to receive the speech signal (e.g., speech signal 308) and the one or more inputs may indicate a speaker's head movements during the meeting. As the speaker's head moves, data augmentation process 10 may identify the spectral modifications between the speech signal recorded by the headset and the speech signal recorded by the microphone array (e.g., microphone array 300). As such, data augmentation process 10 may model 210 the plurality of acoustic variations associated with e.g., speaker head-movements during conversation-following behavior as a mathematical model based upon, at least in part, the identified spectral modifications between the speech signal recorded by the headset and the speech signal recorded by the microphone array. While an example of using particular inputs associated with a speaker's head movements has been described above, it will be appreciated that any inputs associated with any speaker movement and/or speaker orientation may be received 212 and used to model 210 the plurality of acoustic variations associated with speaker movement and/or speaker orientation.

In some implementations, defining 200 the model representative of the plurality of acoustic variations to the speech signal may include generating 214, via a machine learning model, a mapping of the plurality of acoustic variations to one or more feature coefficients of a target domain. For example, data augmentation process 10 may utilize a machine learning model (e.g., machine learning model 72) that is configured to learn to model one or more of the effect of the movement on the signal characteristics and the impact of adaptive beamforming on the output spectrum, for example either in the Short-time Fourier Transform (STFT) domain or Mel-frequency cepstrum domain (MFC or Mel-frequency domain).

As is known in the art, a machine learning model may generally include an algorithm that has been trained to recognize certain types of patterns (e.g., machine learning model 72). For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the program is provided feedback that's analogous to rewards, which it tries to maximize. While three examples of machine learning approaches have been provided, it will be appreciated that other machine learning approaches are possible within the scope of the present disclosure.

In some implementations, the machine learning model (e.g., machine learning model 72) may be configured to receive a plurality of acoustic variations as input and may be configured to output a mapping of the plurality of acoustic variations to one or more feature coefficients of a target domain. For example, the machine learning model (e.g., machine learning model 72) may be configured to generate a mapping of the plurality of acoustic variations to feature coefficients of the STFT domain, the Mel-frequency domain, or any other domain within the scope of the present disclosure.

Referring again to FIG. 4 and in one example, suppose the machine learning model (e.g., machine learning model 72) receives a plurality of acoustic variations associated with movement of a speaker. In this example, data augmentation process 10 may define 200 a model representative of the plurality of acoustic variations by generating 214, via the machine learning model (e.g., machine learning model 72), a mapping of the plurality of acoustic variations associated with movement of a speaker (e.g., speaker 310) to one or more feature coefficients of a target domain (e.g., STFT domain, Mel-frequency domain, etc.).

Referring again to FIG. 5 and in another example, suppose the machine learning model (e.g., machine learning model 72) receives a plurality of acoustic variations associated with adaptive beamforming. In this example, data augmentation process 10 may define 200 a model representative of the plurality of acoustic variations by generating 214, via the machine learning model (e.g., machine learning model 72), a mapping of the plurality of acoustic variations associated with adaptive beamforming to one or more feature coefficients of a target domain (e.g., STFT domain, Mel-frequency domain, etc.).

In some implementations, generating 214 the mapping of a plurality of acoustic variations associated with a change in the relative positioning of a speaker and the microphone array and/or adaptive beamforming to one or more feature coefficients of a target domain may allow data augmentation process 10 to generate a plurality of data augmentations associated with a change in the relative positioning of a speaker and the microphone array and/or adaptive beamforming. For example, with the machine learning model's mapping of the plurality of acoustic variations to one or more feature coefficients of a target domain, data augmentation process 10 may, as will be discussed in greater detail below, apply 202 the mapping of the one or more feature coefficients to a reference signal to generate data augmentations representative of the acoustic variations. In other words, data augmentation process 10 may apply the one or more feature coefficients directly in the target domain to obtain augmented data with the degradations from the acoustic variations included.

Suppose data augmentation process 10 receives a plurality of acoustic variations associated with e.g., head-movements of a speaker during a meeting. In this example, data augmentation process 10 may generate 214, via the machine learning model (e.g., machine learning model 72), a mapping of the plurality of acoustic variations associated with head-movements of a speaker during a meeting to one or more feature coefficients of a target domain. Accordingly, data augmentations associated with head-movements of a speaker during a meeting may be generated by varying these mapped feature coefficients of the target domain to represent other examples of head-movements of a speaker during a meeting.

In another example, suppose data augmentation process 10 receives a plurality of acoustic variations associated with e.g., beamsteering of an adaptive beamformer. In this example, data augmentation process 10 may generate 214, via the machine learning model (e.g., machine learning model 72), a mapping of the plurality of acoustic variations associated with beamsteering of an adaptive beamformer to one or more feature coefficients of a target domain. Accordingly, data augmentations associated with beamsteering of an adaptive beamformer may be generated by varying these mapped feature coefficients of the target domain to represent other examples of beamsteering of an adaptive beamformer. While two examples of sources of acoustic variations that may be mapped to feature coefficients of a target domain have been provided, it will be appreciated that a plurality of acoustic variations from any source may be mapped to feature coefficients within the scope of the present disclosure.

In some implementations, data augmentation process 10 may apply 202 the plurality of time-varying spectral modifications to a reference signal using a filtering operation, thus generating a time-varying spectrally-augmented signal. As discussed above, data augmentation process 10 may define 200 a model representative of the plurality of acoustic variations to a speech signal to define a plurality of time-varying spectral modifications. In some implementations, data augmentation process 10 may generate data augmentations of these time-varying spectral modifications representative of how speech signals are impacted by e.g., a change in the relative positioning of a speaker and the microphone array and/or adaptive beamforming. For example, data augmentation process 10 may apply 202 the plurality of time-varying spectral modifications to a reference signal. In some implementations, a reference signal may generally include any signal that time-varying spectral modifications may be applied to. For example, data augmentation process 10 may apply 202 the plurality of time-varying spectral modifications to a speech signal (e.g., from a corpus of training data). In this manner, a reference signal may be augmented by data augmentation process 10 to include the plurality of time-varying spectral modifications, thus generating a time-varying spectrally-augmented signal.

In some implementations, applying 202 the plurality of time-varying spectral modifications to the reference signal using the filtering operation may include applying 216 the plurality of time-varying spectral modifications to the reference signal using a plurality of time-varying parameters in time domain filtering. For example, data augmentation process 10 may represent the plurality of time-varying spectral modifications as a plurality of time-varying parameters in the time domain (e.g., a plurality of finite impulse response filters configured to represent or mimic the time-varying spectral modifications in the time domain). In this manner, data augmentation process 10 may generate a plurality of finite impulse response filters to represent the plurality of time-varying spectral modifications and may apply 216 the plurality of finite impulse response filters to a reference signal to generate the time-varying spectrally-augmented signal.

In some implementations, applying 202 the plurality of time-varying spectral modifications to the reference signal using the filtering operation may include applying 218 the plurality of time-varying spectral modifications to the reference signal using a plurality of time-varying multiplication factors in frequency domain filtering. For example, data augmentation process 10 may represent the plurality of time-varying spectral modifications as a plurality of time-varying multiplication factors in the frequency domain. In some implementations, data augmentation process 10 may obtain a reference signal (e.g., from a corpus of data) and convert the reference signal to the frequency domain using a STFT. Data augmentation process 10 may apply 218 the plurality of time-varying spectral modifications in the Fourier transform domain. For example, data augmentation process 10 may apply 218 the plurality of time-varying spectral modifications to the signal in the frequency domain using a plurality of time-varying multiplication factors. In some implementations, data augmentation process 10 may perform an inverse Fourier transform to generate a time-varying spectrally-augmented signal in the time domain with the characteristics associated with the plurality of acoustic variations modeled by data augmentation process 10 (e.g., model representative of a change in the relative positioning of a speaker and the microphone array and/or adaptive beamforming).

While two examples of filtering operations have been provided for applying 202 the plurality of time-varying spectral modifications to a reference signal, it will be appreciated that any filtering operation may be used by data augmentation process 10 to apply 202 the plurality of time-varying spectral modifications to the reference signal within the scope of the present disclosure.

In some implementations, data augmentation process 10 may generate training data from a reference signal with the plurality of acoustic variations to represent a change in the relative positioning of a speaker and the microphone array and/or movement associated with adaptive beamforming and/or beamsteering by defining 200 a model to represent the plurality of acoustic variations (e.g., variations associated with a change in the relative positioning of a speaker and the microphone array and/or adaptive beamforming) and applying 202 the plurality of time-varying spectral modifications to a reference signal. In this manner and as will be discussed in greater detail below, data augmentation process 10 may generate augmented training data (e.g., a time-varying spectrally-augmented signal) that enables a speech processing system, such as an automated speech recognition (ASR) system (e.g., ASR system 74) to be less susceptible to time-varying spectral modifications resulting from a change in the relative positioning of a speaker and the microphone array and/or adaptive beamforming.

In some implementations, data augmentation process 10 may train 220 a speech processing system using the time-varying spectrally-augmented signal, thus defining a trained speech processing system. As discussed above and in some implementations, data augmentation process 10 may generate time-varying spectral modifications associated with a change in the relative positioning of a speaker and the microphone array and/or adaptive beamforming that, when used in the training of a speech processing system (e.g., ASR system 74), allows the speech processing system to be more robust against such acoustic variations. In some implementations and as will be discussed in greater detail below, training 220 a speech processing system may generally include training one or more speech processing models (e.g., machine learning or neural network models) configured to process a speech signal for various purposes. For example, speech processing system may generally include an ASR system, a voice biometric system, emotion detection system, medical symptom detection symptom, hearing enhancement system, etc. In one example, training 220 a speech processing system may include training 220 an ASR system configured to process a speech signal to generate recognized speech. In this manner, an automated speech recognition system (e.g., ASR system 74) may be improved to recognize speech signals with acoustic variations resulting from a moving speaker and/or adaptive beamforming. While an example of ASR system has been provided, it will be appreciated that any speech processing system may be trained 220 within the scope of the present disclosure.

In some implementations, data augmentation process 10 may train 222 a speech processing system using the time-varying spectrally-augmented signal and the one or more inputs associated with one or more of speaker location and speaker orientation. For example and as discussed above, data augmentation process 10 may receive 212 one or more inputs associated with one or more of speaker location and speaker orientation. In some implementations, data augmentation process 10 may provide the one or more inputs associated with one or more of speaker location and speaker orientation for training 222 the speech processing system (e.g., ASR system 74). In this manner, the speech processing system (e.g., ASR system 74) may be configured to account for specific speaker location and/or speaker orientation at run-time based upon, at least in part, the one or more inputs received 212 by data augmentation process 10. For example and as will be discussed in greater detail below, in response to detecting particular speaker location and/or specific speaker orientation at run-time (e.g., during operation of a speech processing system (e.g., ASR system 74)), the trained speech processing system (e.g., ASR system 74) may utilize different speech recognition models to account for the speaker location and/or the speaker orientation.

In some implementations, automated speech recognition may be performed 224 via the trained speech processing system executed on the same computing device that trained the speech processing system and/or on another computing device. Accordingly, it will be appreciated that generating augmented data (e.g., time-varying spectrally-augmented signal), training a speech processing system with the augmented data, and performing speech processing via the trained speech processing system may be performed on the same computing device and/or discrete computing devices within the scope of the present disclosure.

Figure 6:
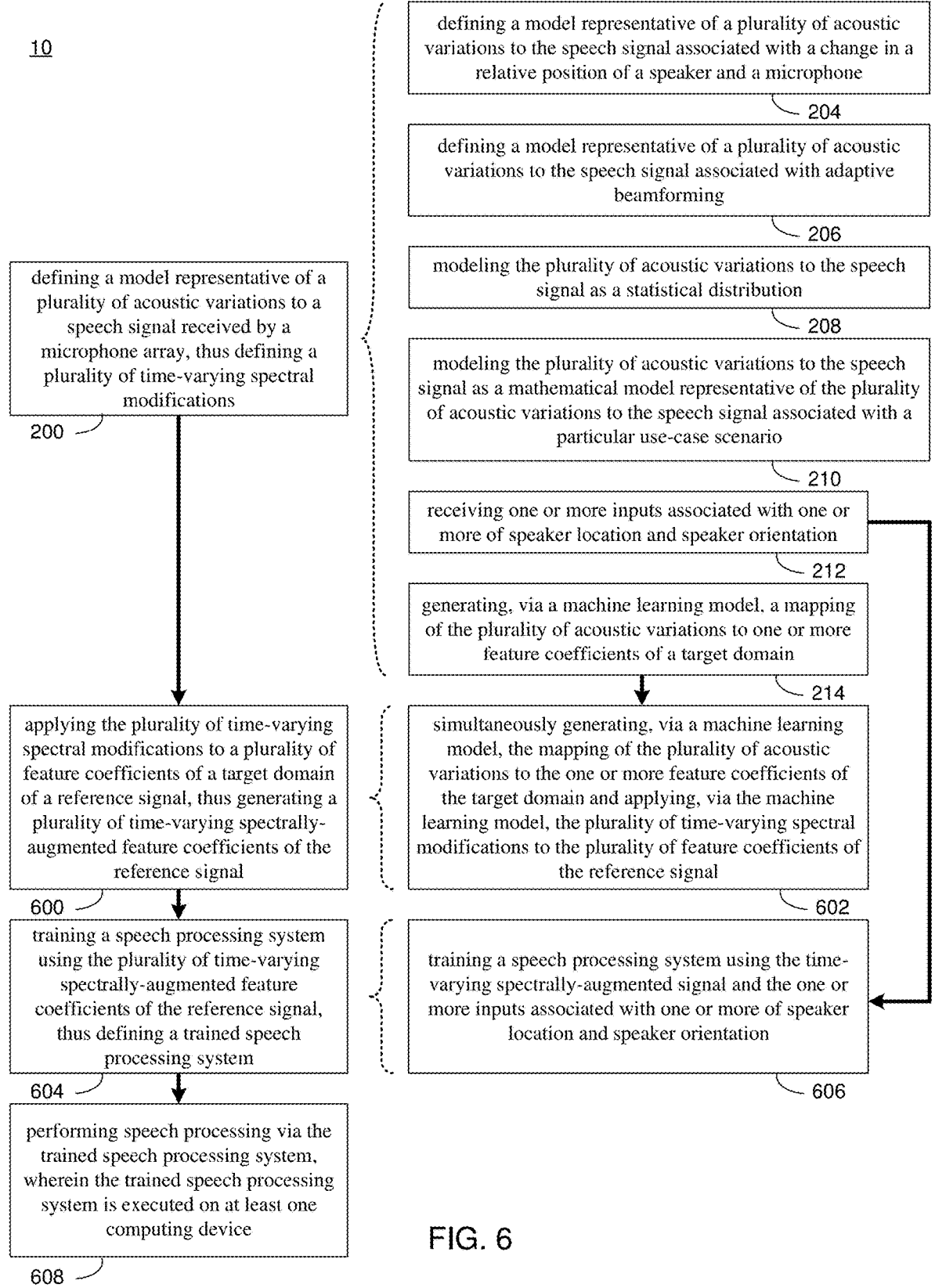
FIG. 6 is a flow chart of one implementation of the data augmentation process of FIG. 1.
Figure 7:
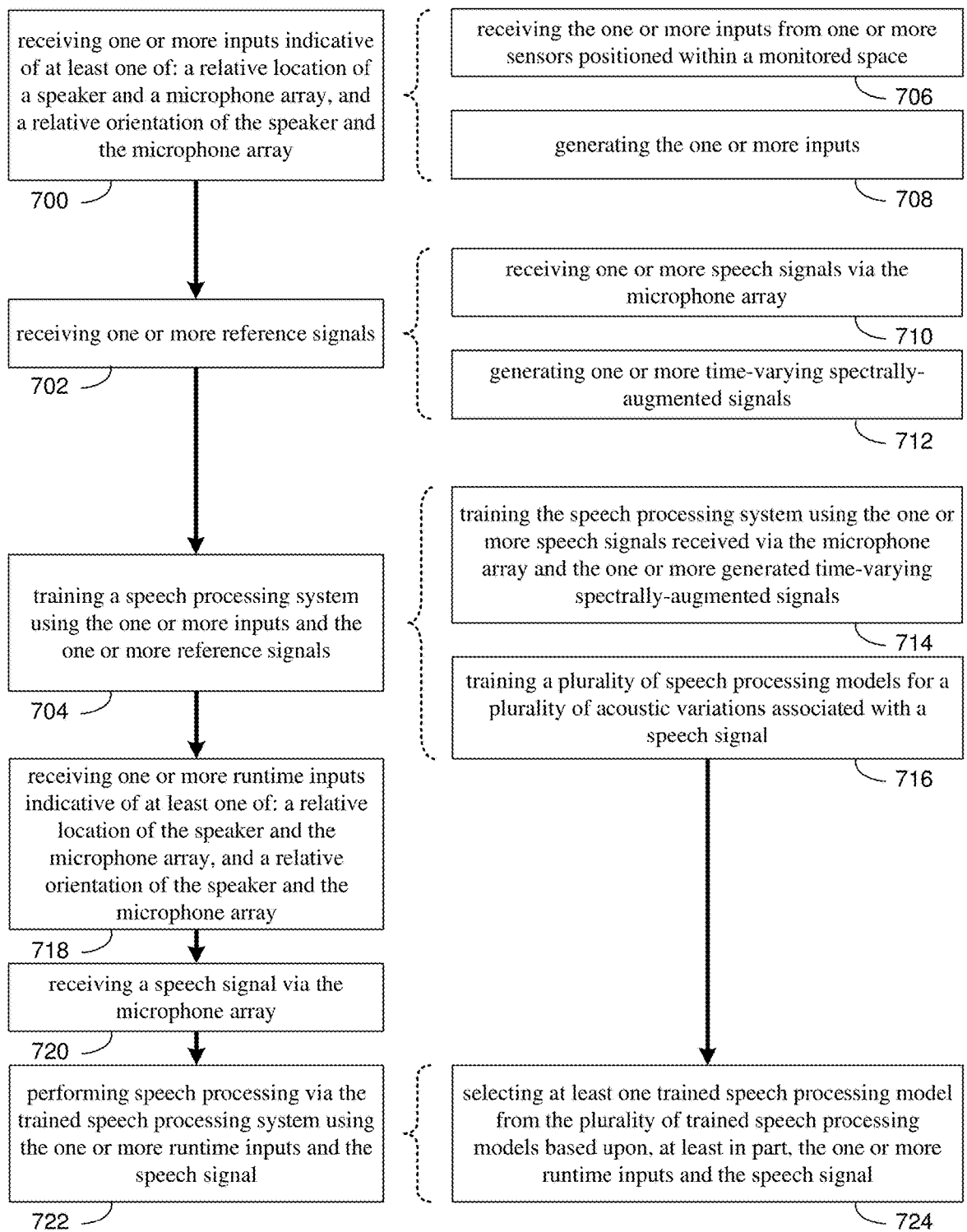
FIG. 7 is a flow chart of one implementation of the speech processing process of FIG. 1.

Referring also to the example of FIG. 6 and in some implementations, data augmentation process 10 may define 200 a model representative of a plurality of acoustic variations to a speech signal, thus defining a plurality of time-varying spectral modifications. The plurality of time-varying spectral modifications may be applied 600 to a plurality of feature coefficients of a target domain of a reference signal, thus generating a plurality of time-varying spectrally-augmented feature coefficients of the reference signal.

As discussed above and in some implementations, data augmentation process 10 may define 200 a model representative of a plurality of acoustic variations to a speech signal, thus defining a plurality of time-varying spectral modifications. For example, data augmentation process 10 may model 208 the plurality of acoustic variations to the speech signal as a statistical distribution. In another example, data augmentation process 10 may model 210 the plurality of acoustic variations to the speech signal as a mathematical model representative of the plurality of acoustic variations to the speech signal associated with a particular use-case scenario. In yet another example, data augmentation process 10 may generate 214, via a machine learning model, a mapping of the plurality of acoustic variations to one or more feature coefficients of a target domain.

In some implementations, data augmentation process 10 may apply 600 the plurality of time-varying spectral modifications to a plurality of feature coefficients of a target domain of a reference signal, thus generating a plurality of time-varying spectrally-augmented feature coefficients of the reference signal. For example, the plurality of acoustic variations modeled by e.g., a statistical distribution and/or a mathematical model for a particular use-case scenario may be applied 600 to a reference signal using a plurality of time-varying modifications in the feature domain of the speech recognizer (e.g., ASR system 74). In some implementations, data augmentation process 10 may determine the feature coefficients of the reference signal in the target domain. In one example, suppose the target domain of a speech recognizer (e.g., ASR system 74) is the Mel-frequency domain. Data augmentation process 10 may determine the Mel-frequency cepstral coefficients for a reference signal in the Mel-frequency domain. In this example, data augmentation process 10 may apply 600 the plurality of time-varying spectral modifications to the Mel-frequency cepstral coefficients of the reference signal. In this manner, data augmentation process 10 may generate a plurality of time-varying spectrally-augmented feature coefficients of the reference signal that reflect a plurality of acoustic variations.

In some implementations, applying 600 the plurality of time-varying spectral modifications to a plurality of feature coefficients of the target domain of the reference signal may include simultaneously generating 602, via a machine learning model, the mapping of the plurality of acoustic variations to the one or more feature coefficients of the target domain and applying, via the machine learning model, the plurality of time-varying spectral modifications to the plurality of feature coefficients of the reference signal. For example and as discussed above, a machine learning model (e.g., machine learning model 72) may be configured to receive a plurality of acoustic variations as input and may be configured to output a mapping of the plurality of acoustic variations to one or more feature coefficients of a target domain. In some implementations, data augmentation process 10 may utilize a machine learning model (e.g., machine learning model 72) in an "end to end" configuration where data augmentation process 10 simultaneously generates 602 the mapping of the plurality of acoustic variations to the one or more feature coefficients of the target domain and applies the mapping to the feature coefficients of the reference signal. For example, data augmentation process 10 may receive a reference signal and a plurality of acoustic variations as inputs into the machine learning model and output a data augmentation of the reference signal including the plurality of acoustic variations. In this manner, data augmentation process 10 may generate augmented data via a machine learning model (e.g., machine learning model 72) from a reference signal and one or more parameters associated with particular acoustic variations.

In some implementations, data augmentation process 10 may train 604 a speech processing system using the plurality of time-varying spectrally-augmented feature coefficients of the reference signal, thus defining a trained speech processing system. As discussed above and in some implementations, data augmentation process 10 may generate time-varying spectral modifications associated with a change in the relative positioning of a speaker and the microphone array and/or adaptive beamforming that, when used in the training of an speech processing system (e.g., ASR system 74), allows the automated speech recognition system to be more robust against such acoustic variations. In some implementations and as will be discussed in greater detail below, training 604 a speech processing system may generally include training one or more speech processing models configured to process a speech signal for various purposes. For example, speech processing system may generally include an ASR system, a voice biometric system, emotion detection system, medical symptom detection symptom, hearing enhancement system, etc. In one example, training 604 a speech processing system may include training 604 an ASR system configured to process a speech signal to generate recognized speech. In this manner, an automated speech recognition system (e.g., ASR system 74) may be improved to recognize speech signals with acoustic variations resulting from a moving speaker and/or adaptive beamforming. While an example of an ASR system has been provided, it will be appreciated that any speech processing system may be trained 604 within the scope of the present disclosure.

In some implementations, data augmentation process 10 may train 606 a speech processing system using the time-varying spectrally-augmented feature coefficients of the reference signal and the one or more inputs associated with one or more of speaker location and speaker orientation. For example and as discussed above, data augmentation process 10 may receive 212 one or more inputs associated with one or more of speaker location and speaker orientation. In some implementations, data augmentation process 10 may provide the one or more inputs associated with one or more of speaker location and speaker orientation for training 606 the speech processing system (e.g., ASR system 74). In this manner, ASR system 74 may be configured to account for specific speaker location and/or speaker orientation at run-time based upon, at least in part, the one or more inputs received 212 by data augmentation process 10. For example and as will discussed in greater detail below, in response to detecting particular speaker location and/or specific speaker orientation at run-time (e.g., during operation of the speech processing system (e.g., ASR system 74)), the trained speech processing system (e.g., ASR system 74) may utilize different speech recognition models to account for the speaker location and/or the speaker orientation.

In some implementations, data augmentation process 10 may perform 608 speech processing via the trained speech processing system, where the trained speech processing system is executed on at least one computing device. For example, embodiments of data augmentation process 10 may be used in ambient speech applications, such as Dragon® Speech Recognition Software available from Nuance Communications, Inc. of Burlington, Mass., with multiple, distant microphones or for a health care application where the doctor and patient speech is acquired through a microphone array (e.g., using Dragon® Ambient eXperience™ (DAX)); Dragon is a registered trademark of Nuance Communications, Inc. in the United States, other countries or both. In some implementations, embodiments of data augmentation process 10 may be utilized to enhance ASR performance in various settings (e.g., voice-based vehicular control systems, voice-based dialogue systems, etc.). In some implementations, speech processing may be performed 608 via the trained speech processing system executed on the same computing device that trained the speech processing system and/or on another computing device. Accordingly, it will be appreciated that generating augmented data (e.g., time-varying spectrally-augmented feature coefficients), training a speech processing system with the augmented data, and performing speech processing via the trained speech processing system may be performed on the same computing device and/or discrete computing devices within the scope of the present disclosure.

As discussed above and referring also at least to FIGS. 7-8, speech processing process 11 may receive 700 one or more inputs indicative of at least one of: a relative location of a speaker and a microphone array, and a relative orientation of the speaker and the microphone array. One or more reference signals may be received 702. A speech processing system may be trained 704 using the one or more inputs and the reference signal.

In some implementations, speech processing process 11 may allow for inputs or input signals that indicate a speaker's location relative to a microphone array and/or a speaker's orientation relative to a microphone array to be used to train and/or perform speech processing in a way that accounts for dynamic acoustic variations. As discussed above and in many situations, a microphone array may be used to receive speech signals. However, microphone arrays can have the effect of filtering the spectrum of speech in a way that depends on angle. For example, if the position of a speaker varies with time in the beampattern of a beamformer, the speech may be affected by a time-varying filter. In the case of adaptive beamforming, the beamformer may attempt to steer dynamically towards a speaker, thereby introducing another time variation. In some implementations and as will be discussed in greater detail below, implementations of speech processing process 11 may specifically train a speech processing system to account for these dynamic acoustic variations when performing speech recognition.

In some implementations, speech processing process 11 may receive 700 one or more inputs indicative of at least one of: a relative location of a speaker and a microphone array, and a relative orientation of the speaker and the microphone array. As discussed above and in some implementations, inputs may be received that are distinct from speech signals received at a microphone array. Specifically, these inputs may indicate a relative location of a speaker and a microphone array (e.g., the location of a speaker relative to a microphone array within a monitored space) and/or a relative orientation of a speaker and a microphone array (e.g., the orientation of a speaker relative to a microphone array). In this manner and as will be discussed in greater detail below, speech processing process 11 may utilize the speaker's location and orientation to train a speech processing system (e.g., an ASR system, a voice biometric system, emotion detection system, medical symptom detection symptom, hearing enhancement system) to account for dynamic acoustic variations when performing speech processing.

In some implementations, receiving 700 the one or more inputs may include receiving 706 the one or more inputs from one or more sensors positioned within a monitored space. For example, speech processing process 11 may utilize one or more sensors (e.g., audio-visual sensors, camera systems, microphone array 300, etc.) deployed within a monitored space to receive one or more inputs indicative of a speaker's location within the monitored space and/or a speaker's orientation (e.g., head orientation, body orientation, etc.) within the monitored space. Other examples of sensors may generally include an RGB imaging system, an infrared imaging system, an ultraviolet system, a SONAR imaging system, a RADAR imaging system, a thermal imaging system. As such, it will be appreciated that any sensor may be used to receive these inputs within the scope of the present disclosure.

Figure 8:
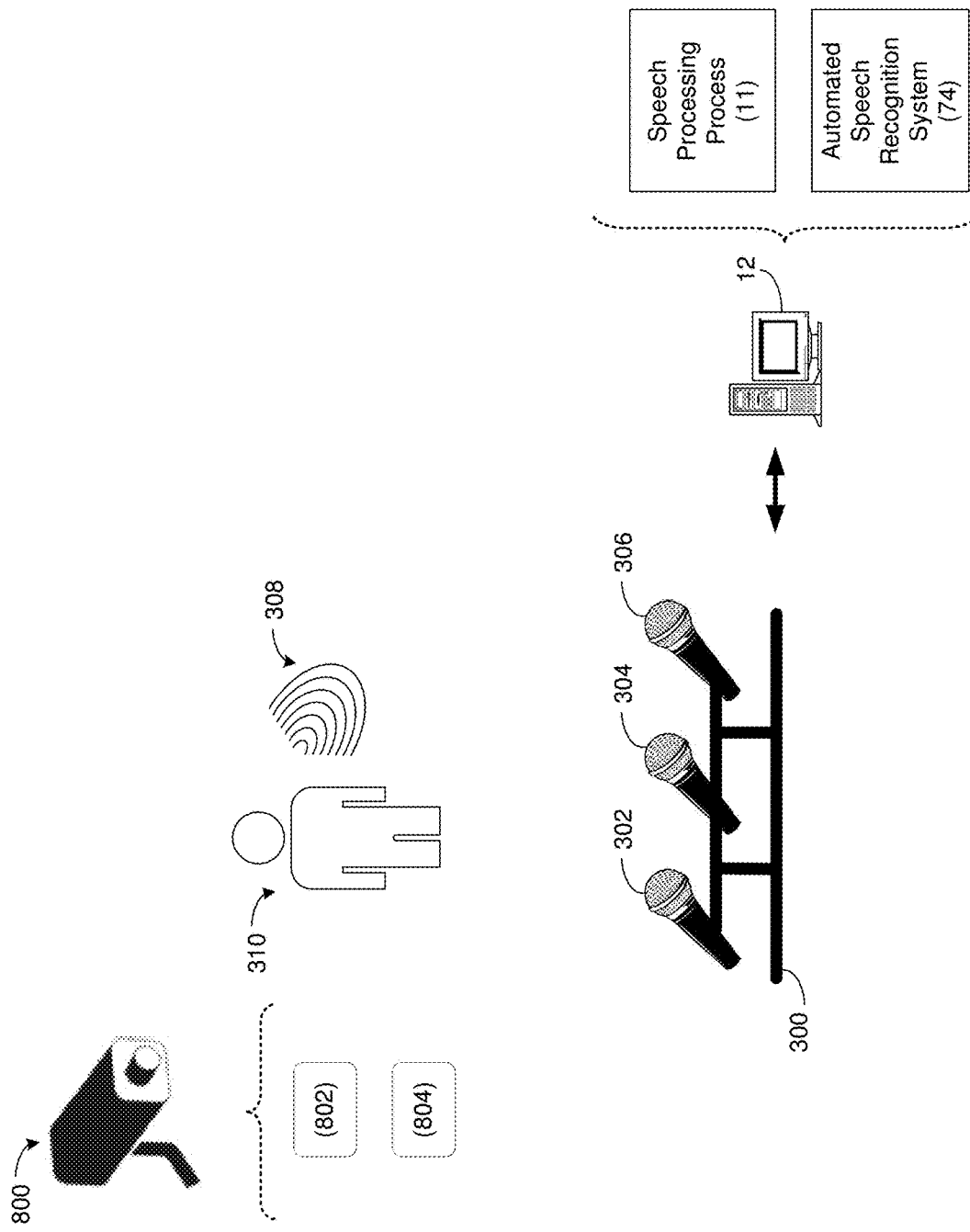
FIG. 8 is a diagrammatic view of a microphone array deployed in a monitored space while a speaker is speaking according to one implementation of the speech processing process of FIG. 1.

Referring also to the example of FIG. 8 and in some implementations, speech processing process 11 may receive 700 an input indicative of a relative location or position of a speaker and a microphone array. For example, data augmentation process 10 may receive 706 an input indicative of a direction of arrival (DOA) angle estimated by a beamformer (e.g., of microphone array 300). In this example, the DOA may indicate the speaker's location within a monitored space. In another example, suppose a camera system (e.g., camera system 800) is deployed within a monitored space. In this example, suppose camera system 800 is configured to record a video of a speaker within the monitored space. Suppose that speaker 310 moves within the monitored space while microphone array 300 is capturing speech signals. In this example, speech processing process 11 may receive 706 one or more inputs (e.g., input 802) indicative of the speaker's movement within the monitored space from camera system 800 where the inputs (e.g., input 802) may indicate the speaker's position or location within the monitored space. While an example of receiving 706 one or more inputs indicative of a relative location of a speaker and a microphone array from e.g., a camera system has been provided, it will be appreciated that the one or more inputs indicative of a relative location of a speaker and a microphone array may be received from any sensor(s) within the scope of the present disclosure.

In some implementations, speech processing process 11 may receive an input indicative of a relative orientation of a speaker and a microphone array. Referring again to the example of FIG. 8 and in some implementations, suppose speaker 310's head turns while camera system 800 and microphone array 300 are recording video and audio from speaker 310. In this example, camera system 800 may identify the change in speaker 310's orientation (e.g., resulting from speaker 310's head movements). In response to identifying the changes in speaker 310's orientation, speech processing process 11 may receive 706 one or more inputs indicative of the relative orientation of the speaker to microphone array 300 within the monitored space. While an example of receiving 706 one or more inputs indicative of a relative orientation of a speaker and a microphone array from a camera system has been provided, it will be appreciated that the one or more inputs indicative of a relative orientation of a speaker and a microphone array may be received from any sensor(s) within the scope of the present disclosure.

In some implementations, receiving 700 the one or more inputs may include generating 708 the one or more inputs. For example, speech processing process 11 may generate 708 one or more simulated inputs indicative of at least one of: a relative location of a speaker and a microphone array, and a relative orientation of the speaker and the microphone array. In some implementations and as discussed above, speech processing process 11 may augment one or more reference or existing inputs to indicate a particular relative location of a speaker and a microphone array and/or a particular relative orientation of a speaker and a microphone array. For example and as discussed above, suppose speaker 310 moves from a first known location (e.g., known to speech processing process 11) to a second known location (e.g., known to speech processing process 11). In this example, speech processing process 11 may generate one or more inputs indicative of the relative location of speaker 310 and microphone array 300. Specifically, speech processing process 11 may generate one or more inputs indicative of the first location and one or more inputs indicative of the second location. In this manner, speech processing process 11 may generate 708 the one or more inputs that would be received by a sensor if speaker 310 moves from the first location to the second location.

In another example, suppose speaker 310 moves from a first orientation (e.g., known to speech processing process 11) to a second orientation (e.g., known to speech processing process 11). In this example, speech processing process 11 may generate one or more inputs indicative of the relative orientation of speaker 310 and microphone array 300. Specifically, speech processing process 11 may generate one or more inputs indicative of the first orientation and one or more inputs indicative of the second orientation. In this manner, speech processing process 11 may generate 708 the one or more inputs that would be received by a sensor (or set of sensors) if a speaker moves from the first orientation to the second orientation.

In some implementations, speech processing process 11 may receive 702 one or more reference signals. For example and as discussed above, a reference signal may generally include a speech signal that may be received in real-time, a previously received and recorded speech signal (e.g., such as a speech signal saved to a corpus of speech signals), and/or a signal generated via data augmentation (e.g., via data augmentation process 10 as discussed above). In some implementation and as discussed above, the one or more reference signals may include acoustic variations introduced from changes in the relative position and/or orientation of a speaker and a microphone array.

In some implementations, receiving 702 the one or more reference signals may include receiving 710 one or more speech signals from the microphone array. For example, speech processing process 11 may receive 710 and store one or more speech signals over a defined period of time. Referring again to the example of FIG. 8 and in some implementations, the reference signal may be received 710 while speaker 310 is speaking. In this example, microphone array 300 may be configured to receive the one or more speech signals from speaker 310. In some implementations, speech processing process 11 may store the one or more speech signals from a speaker for real-time or subsequent training on a speech processing system (e.g., ASR system 74).

In some implementations, receiving 702 the one or more reference signals may include generating 712 one or more time-varying spectrally-augmented signals. For example and as discussed above, data augmentation process 10 may generate one or more time-varying spectrally-augmented signals by defining 200 a model representative of a plurality of acoustic variations to a speech signal, thus defining a plurality of time-varying spectral modifications and applying 202 the plurality of time-varying spectral modifications to a reference signal using a filtering operation. In this manner, a time-varying spectrally-augmented signal may be generated with the characteristics associated with the plurality of acoustic variations modeled by data augmentation process 10 (e.g., a model representative of a change in the relative positioning of a speaker and the microphone array and/or adaptive beamforming).

In some implementations, speech processing process 11 may train 704 a speech processing system using the one or more inputs and the one or more reference signals. As discussed above and in some implementations, training the speech processing system (e.g., ASR system 74) may generally include training one or more speech processing models of a speech processing system with various inputs and expected outputs. For example, the one or more speech processing models may generally include machine learning or neural network models configured to be trained for various types of speech processing. For example, a speech processing system may include an ASR system with one or more ASR models configured to be trained to recognize speech from input speech signals. With the inclusion of time-varying acoustic variations to a speech signal from speaker movement and/or adaptive beamforming, ASR models trained for static conditions may be unable to accurately recognize speech in these dynamic environments. While an example of an ASR system with ASR models has been described, it will be appreciated that any speech processing system with various speech processing models, may be trained within the scope of the present disclosure.

In some implementations, with inputs indicative of a relative location of a speaker and a microphone array and/or a relative orientation of the speaker and the microphone array, automated speech recognition process 11 may train 704 a speech processing system to receive and utilize these inputs at run-time when performing speech processing. In this manner, speech processing process 11 may train 704 a speech processing system to be more robust against acoustic variations by utilizing additional inputs indicative of a relative location of a speaker and a microphone array and/or a relative orientation of the speaker and the microphone array. As discussed above, the one or more inputs may be received from sensors other than microphones or microphone elements of a microphone array and may indicate a relative location and/or relative orientation of a speaker and a microphone array.

In one example, speech processing process 11 may train 704 a speech processing system using one or more inputs from one or more sensors positioned within a monitored space and one or more speech signals from the microphone array. In this example, speech processing process 11 may train 704 a speech processing system (e.g., ASR system 74) with actual sensor data and actual speech signals received from a microphone array. In another example, speech processing process 11 may train 704 a speech processing system using one or more inputs from one or more sensors positioned within a monitored space and one or more time-varying spectrally-augmented signals. In this example, speech processing process 11 may train 704 a speech processing system (e.g., ASR system 74) with actual sensor data and one or more time-varying spectrally-augmented signals augmented from one or more reference signals.

In another example, speech processing process 11 may train 704 a speech processing system using one or more generated inputs and one or more speech signals from the microphone array. In this example, speech processing process 11 may train 704 a speech processing system (e.g., ASR system 74) with augmented inputs indicative of a relative location of a speaker and a microphone array and/or a relative orientation of the speaker and the microphone array and actual speech signals received from a microphone array. In another example, speech processing process 11 may train 704 a speech processing system using one or more generated inputs and one or more time-varying spectrally-augmented signals. In this example, speech processing process 11 may train 704 a speech processing system (e.g., ASR system 74) with augmented inputs indicative of a relative location of a speaker and a microphone array and/or a relative orientation of the speaker and the microphone array and actual speech signals received from a microphone array and one or more time-varying spectrally-augmented signals augmented from one or more reference signals. Accordingly, it will be appreciated that any combination of augmented and actual inputs and/or reference signals may be used to train a speech processing system within the scope of the present disclosure.

In some implementations, training 704 an speech processing system using the one or more inputs and the one or more reference signals may include training a single speech processing model multiple times with various combinations of reference signals and inputs to account for many acoustic variations. For example, suppose a speech processing system (e.g., ASR system 74) includes a single speech processing model (e.g., ASR model 76). In this example, speech processing process 11 may train ASR model 76 with a first set of inputs and a first set of reference signals, where the first set of reference signals are associated with a first set of acoustic variations (e.g., resulting from a change in the relative position of a speaker and a microphone array and/or resulting from adaptive beamforming). Continuing with this example, speech processing process 11 may train ASR model 76 with a second set of inputs and a second set of reference signals, where the second set of reference signals are associated with a second set of acoustic variations (e.g., resulting from a change in the relative position of a speaker and a microphone array and/or resulting from adaptive beamforming). In this example, ASR model 76 may be trained to account for the first and second sets of acoustic variations and first and second set of inputs. While an example of e.g., two sets of inputs and two sets of reference signals has been provided for training a single speech processing model, it will be appreciated that any number of sets of inputs and any number of sets of reference signals may be used to train a single speech processing model within the scope of the present disclosure.

In some implementations, training 704 the speech processing system using the one or more inputs and the one or more reference signals may include training 714 the speech processing system using the one or more speech signals received via the microphone array and the one or more generated time-varying spectrally-augmented signals. For example, speech processing process 11 may train 714 the speech processing system (e.g., ASR system 74) with a first portion of actual speech signals and a second portion of generated time-varying spectrally-augmented signals. In one example, speech processing process 11 may receive 710 e.g., 10 hours of field data from actual speech signals and may generate 712 or receive e.g., 90 hours of time-varying spectrally-augmented signals. In this example, speech processing process 11 may train 714 the speech processing system with both speech signals received via a microphone array and generated time-varying spectrally-augmented signals. While an example with specific amounts of speech signals and generated time-varying spectrally-augmented signals, it will be appreciated that any combination of speech signals and generated time-varying spectrally-augmented signals may be used to train 714 a speech processing system within the scope of the present disclosure.

In some implementations, training 704 the speech processing system using the one or more inputs and the reference signal may include training 716 a plurality of speech processing models for a plurality of acoustic variations associated with one or more speech signals. For example, speech processing process 11 may train 716 multiple, distinct speech processing models when training a speech processing system. In one example, speech processing process 11 may train a first speech processing model (e.g., ASR model 76) with a first set of inputs and a first set of reference signals, where the first set of reference signals are associated with a first set of acoustic variations (e.g., resulting from a change in the relative position of a speaker and a microphone array and/or resulting from adaptive beamforming). Continuing with this example, speech processing process 11 may train a second speech processing model (e.g., ASR model 78) with a second set of inputs and a second set of reference signals, where the second set of reference signals are associated with a second set of acoustic variations (e.g., resulting from a change in the relative position of a speaker and a microphone array and/or resulting from adaptive beamforming). Speech processing process 11 may train a third speech processing model (e.g., ASR model 80) with a third set of inputs and a third set of reference signals, where the thirds set of reference signals are associated with a third set of acoustic variations (e.g., resulting from a change in the relative position of a speaker and a microphone array and/or resulting from adaptive beamforming). Accordingly, ASR system 74 may include e.g., three ASR models separately trained to account for a first, second, and third sets of acoustic variations and a first, second, and third sets of inputs. While an example of e.g., three sets of inputs and three sets of reference signals has been provided for training e.g., three speech processing models, it will be appreciated that any number of sets of inputs and any number of sets of reference signals may be used to train any number of speech processing models within the scope of the present disclosure. In this manner, many speech processing models may be trained 716 to allow a speech processing system to process speech in various dynamic acoustic environments (e.g., a change in the relative position of a speaker and a microphone array, adaptive beamforming, etc.).

In some implementations, speech processing process 11 may receive 718 one or more run-time inputs indicative of at least one of: a relative location of the speaker and the microphone array, and a relative orientation of the speaker and the microphone array. As discussed above and referring again to the example of FIG. 8, run-time inputs (e.g., run-time input 804) may be received from various sensors deployed within a monitored space. For example, a camera system (e.g., camera system 800) may be deployed in a monitoring space. As will be discussed in greater detail below, speech processing process 11 may allow speech processing to be performed by a trained speech processing system based upon, at least in part, one or more inputs received 718 at run-time (i.e., one or more run-time inputs).

In some implementations, speech processing process 11 may receive 720 a speech signal via the microphone array. Referring again to FIG. 8, suppose speaker 310 is speaking in a monitored space. In this example, microphone array 300 may receive 720 speech signal 308 uttered by speaker 310. While an example is provided of receiving e.g., one speech signal, it will be appreciated that any number of speech signals may be received 720 within the scope of the present disclosure.

In some implementations, speech processing process 11 may perform 722 speech processing via the trained speech processing system using the one or more run-time inputs and the speech signal. Continuing with the above example, suppose a speech processing system (e.g., ASR system 74) is trained using one or more inputs and one or more reference signals as discussed above. In this example, ASR system 74 may be configured to perform 722 automated speech recognition for the received one or more speech signals (e.g., speech signal 308) based upon, at least in part, the training of ASR system 74 with the one or more inputs (e.g., received from sensors and/or generated before training) and the one or more reference signals (e.g., speech signals received and/or generated before training) to account for acoustic variations present in the one or more speech signals. Accordingly, ASR system 74 may utilize the one or more run-time inputs (e.g., run-time input 804) to help ASR system 74 to recognize particular acoustic variations within speech signal 308. For example, by utilizing run-time input 804, ASR system 74 may be able to determine that e.g., speaker 310 is moving within the monitored space while speaking and/or whether microphone array 300 is performing adaptive beamforming to steer the beamform toward speaker 310. Accordingly, speech processing process 11 may improve the ability for a trained ASR system to perform 722 more accurate speech recognition using one or more runtime inputs. As discussed above and in some implementations, speech processing using the trained speech processing system may be performed 722 on the same computing device that trained 704 the speech processing system and/or on a separate computing device, within the scope of the present disclosure. While an example of an ASR system has been described above, it will be appreciated that speech processing may be performed 722 using any speech processing system within the scope of the present disclosure.

In some implementations, performing 722 speech processing via the trained speech processing system using the one or more run-time inputs and the speech signal may include selecting 724 at least one trained speech processing model from the plurality of trained speech processing models based upon, at least in part, the one or more run-time inputs and the speech signal. For example and as discussed above, suppose speech processing process 11 trains 704 a plurality of speech processing models for a plurality of acoustic variations associated with the one or more reference signals and one or more inputs. In this example, speech processing process 11 may use the one or more run-time inputs to select 724 a trained automated speech model for performing speech recognition on the received speech signal. As discussed above, suppose that speech processing process 11 trains 704 e.g., three speech processing models (e.g., ASR models 76, 78, 80) for three different combinations of inputs and/or reference signals. In this example, upon receiving 718 run-time input 804 and receiving 720 speech signal 308, speech processing process 11 may select 724 a trained ASR model from the plurality of ASR models (e.g., one of ASR models 76, 78, 80). While an example of selecting 724 a trained ASR model from e.g., three trained ASR models has been provided, it will be appreciated that any number of speech processing models may be selected from any number of trained speech processing models for performing speech processing within the scope of the present disclosure.

In some implementations, speech processing process 11 may select 724 a speech processing model from the plurality of speech processing models using the one or more run-time inputs. For example, speech processing process 11 may select a particular speech processing model from the plurality of trained speech processing models in response to receiving a particular run-time input or set of run-time inputs corresponding to inputs used to train the speech processing model. In this manner, speech processing process 11 may be configured to identify a particular speaker position and/or speaker orientation relative to a microphone array during run-time and may use a speech processing model trained using the same or similar inputs.

Figure 9:
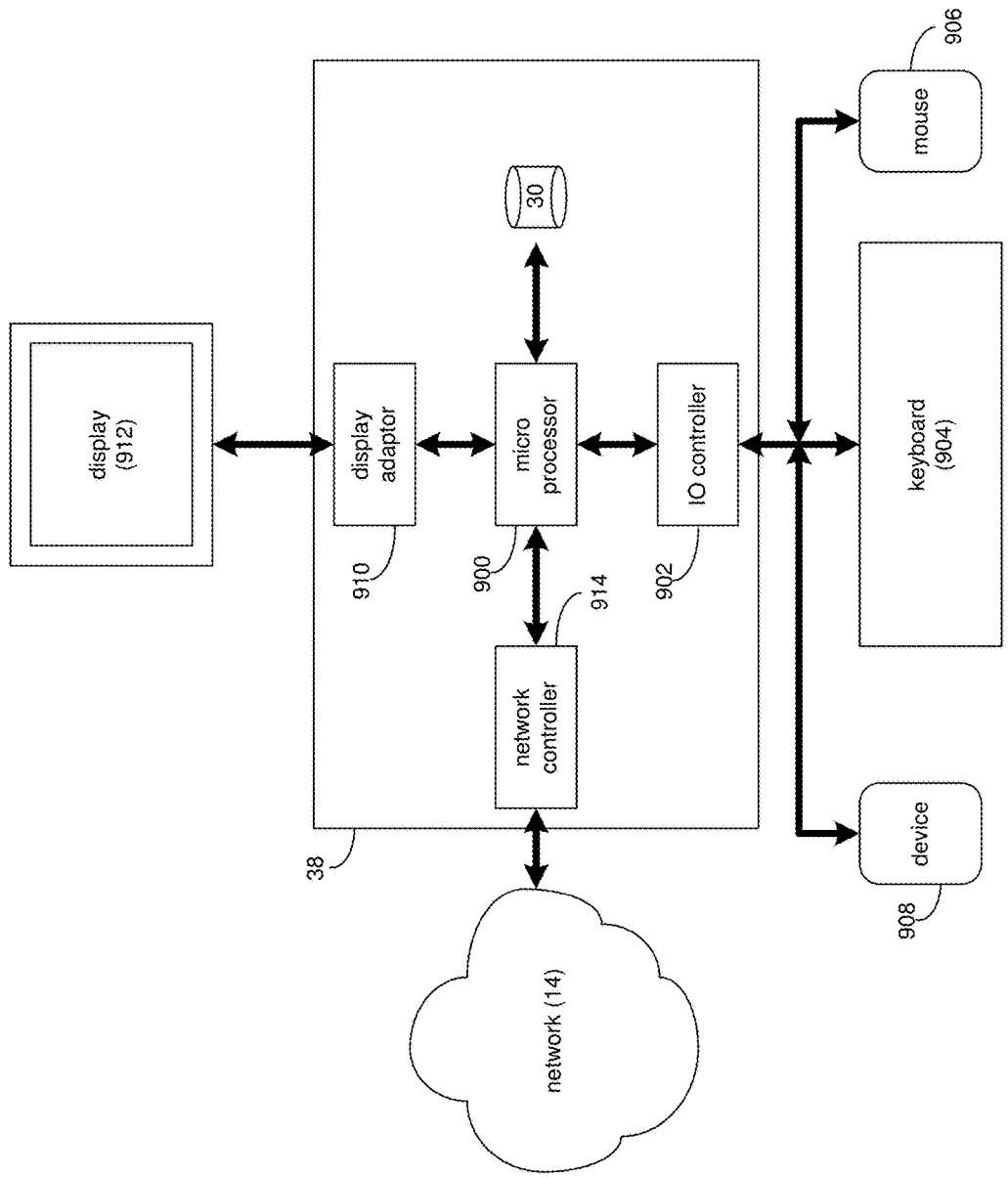
FIG. 9 is an example diagrammatic view of a client electronic device of FIG. 1 according to one or more example implementations of the disclosure.

Referring also to FIG. 9, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, data augmentation process 10 may be substituted for client electronic device 38 within FIG. 9, examples of which may include but are not limited to computing device 12 and/or client electronic devices 40, 42, 44.

Client electronic device 38 may include a processor and/or microprocessor (e.g., microprocessor 900) configured to, e.g., process data and execute the above-noted code/instruction sets and subroutines. Microprocessor 900 may be coupled via a storage adaptor (not shown) to the above-noted storage device(s) (e.g., storage device 30). An I/O controller (e.g., I/O controller 902) may be configured to couple microprocessor 900 with various devices, such as keyboard 904, pointing/selecting device (e.g., mouse 906), custom device, such a microphone (e.g., device 908), USB ports (not shown), and printer ports (not shown). A display adaptor (e.g., display adaptor 910) may be configured to couple display 912 (e.g., CRT or LCD monitor(s)) with microprocessor 900, while network controller/adaptor 914 (e.g., an Ethernet adaptor) may be configured to couple microprocessor 900 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving one or more inputs indicative of at least one of:
      a relative location of a speaker and a microphone array, and
      a relative orientation of the speaker and the microphone array;
   receiving one or more reference signals; and
   training a speech processing system using the one or more inputs and the one or more reference signals, wherein training the speech processing system using the one or more inputs and the one or more reference signals includes training a plurality of speech processing models for a plurality of acoustic variations associated with the one or more reference signals;
   receiving one or more run-time inputs indicative of at least one of:
      the relative location of the speaker and the microphone array, and
      the relative orientation of the speaker and the microphone array;
   receiving a speech signal via the microphone array; and
   performing speech processing via the trained speech processing system using the one or more run-time inputs and the speech signal.

2. The computer-implemented method of claim 1, wherein receiving the one or more inputs includes one or more of:
   receiving the one or more inputs from one or more sensors positioned within a monitored space; and
   generating the one or more inputs.

3. The computer-implemented method of claim 1, wherein receiving the one or more reference signals includes one or more of:
   receiving one or more speech signals via the microphone array; and
   generating one or more time-varying spectrally-augmented signals.

4. The computer-implemented method of claim 3, wherein training the speech processing system using the one or more inputs and the one or more reference signals includes training the speech processing system using the one or more speech signals received via the microphone array and the one or more generated time-varying spectrally-augmented signals.

5. The computer-implemented method of claim 1, wherein performing speech processing via the trained speech processing system using the one or more run-time inputs and the speech signal includes selecting at least one trained speech processing model from the plurality of trained speech processing models based upon, at least in part, the one or more run-time inputs and the speech signal.

6. A computer program product residing on a non-transitory computer readable medium having a plurality of instructions stored thereon which, when executed by a processor, cause the processor to perform operations comprising:
receiving one or more inputs indicative of at least one of:
a relative location of a speaker and a microphone array, and
a relative orientation of the speaker and the microphone array;
receiving one or more reference signals; and
training a speech processing system using the one or more inputs and the one or more reference signals, wherein training the speech processing system using the one or more inputs and the one or more reference signals includes training a plurality of speech processing models for a plurality of acoustic variations associated with the one or more reference signals;
receiving one or more run-time inputs indicative of at least one of:
the relative location of the speaker and the microphone array, and
the relative orientation of the speaker and the microphone array;
receiving a speech signal via the microphone array; and
performing speech processing via the trained speech processing system using the one or more run-time inputs and the speech signal.

7. The computer program product of claim 6, wherein receiving the one or more inputs includes one or more of:
receiving the one or more inputs from one or more sensors positioned within a monitored space; and
generating the one or more inputs.

8. The computer program product of claim 6, wherein receiving the one or more reference signals includes one or more of:
receiving one or more speech signals via the microphone array; and
generating one or more time-varying spectrally-augmented signals.

9. The computer program product of claim 8, wherein training the speech processing system using the one or more inputs and the one or more reference signals includes training the speech processing system using the one or more speech signals received via the microphone array and the one or more generated time-varying spectrally-augmented signals.

10. The computer program product of claim 6, wherein performing speech processing via the trained speech processing system using the one or more run-time inputs and the speech signal includes selecting at least one trained speech processing model from the plurality of trained speech processing models based upon, at least in part, the one or more run-time inputs and the speech signal.

11. A computing system comprising:
a memory; and
a processor configured to receive one or more inputs indicative of at least one of: a relative location of a speaker and a microphone array, and a relative orientation of the speaker and the microphone array; wherein the processor is further configured to receive one or more reference signals; and wherein the processor is further configured to train a speech processing system using the one or more inputs and the one or more reference signals, wherein training the speech processing system using the one or more inputs and the one or more reference signals includes training a plurality of speech processing models for a plurality of acoustic variations associated with the one or more reference signals, wherein the processor is further configured to receive one or more run-time inputs indicative of at least one of the relative location of the speaker and the microphone array, and the relative orientation of the speaker and the microphone array, wherein the processor is further configured to receive a speech signal via the microphone array, and wherein the processor is further configured to perform speech processing via the trained speech processing system using the one or more run-time inputs and the speech signal.

12. The computing system of claim 11, wherein receiving the one or more inputs includes one or more of:
receiving the one or more inputs from one or more sensors positioned within a monitored space; and
generating the one or more inputs.

13. The computing system of claim 11, wherein receiving the one or more reference signals includes one or more of:
receiving one or more speech signals via the microphone array; and
generating one or more time-varying spectrally-augmented signals.

14. The computing system of claim 13, wherein training the speech processing system using the one or more inputs and the one or more reference signals includes training the speech processing system using the one or more speech signals received via the microphone array and the one or more generated time-varying spectrally-augmented signals.

* * * * *